Patented July 5, 1949

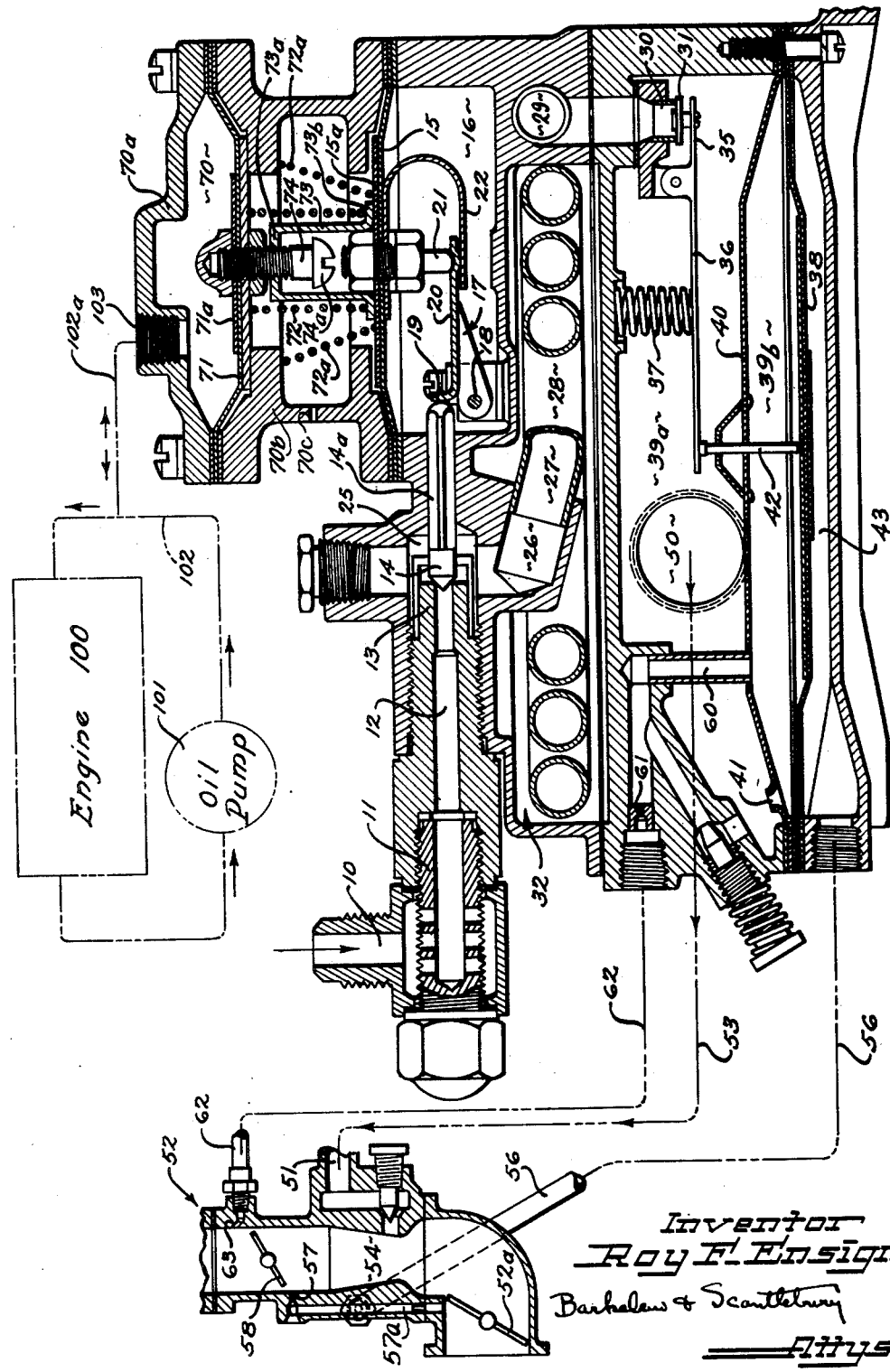

2,475,086

UNITED STATES PATENT OFFICE 2,475,086

CONTROL OF FEED PRESSURE FOR INTERNAL-COMBUSTION ENGINES

Roy F. Ensign, San Marino, Calif., assignor to Ensign Carburetor Company, Huntington Park, Calif., a corporation of California Application August 9, 1946, Serial No. 689,579

10 Claims. (Cl. 123—120)

This invention deals with improvements in the fuel feed systems of internal combustion engines which use a gaseous fuel; and a general purpose and object of the invention is to provide an improved system, completely automatic in its action, and in which the gaseous fuel is completely or substantially completely shut off when the engine is not operating and is fed at the proper predetermined operating pressure as soon as the engine has started its operation. The nature of the invention and its further purposes and accomplishments will be understood from what follows.

Gaseous fuel feed systems for internal combustion engines ordinarily and usually include a pressure regulator of one or more stages, by which the gaseous fuel from a relatively high pressure source is fed at a predetermined and regulated pressure to the mixing valve or carburetor. Such regulators are usually designed and adjusted to deliver the gaseous fuel at a low pressure, substantially atmospheric or somewhat sub-atmospheric. The closing pressures on the valve or valves of such regulators are comparatively light and the valves are therefore liable to leakage because they are not tightly closed. In the past, shut-off valves have been used in such systems to positively cut off the gas feed, and such a shut-off valve has been made to be operated by the lubricating oil pressure in such a manner as to close the shut-off valve when the engine is not operating and the oil pressure is zero. But in any such arrangement the shut-off valve must be manually operated to open it for starting the engine and keep it open until the oil pressure has built up to normal operating pressure.

The present invention applies the lubricating oil pressure to the pressure regulator in such a manner as to modify the action of the regulator and to act entirely automatically to allow the regulator valve or valves to be tightly closed when the engine is not operating, to supply fuel gas at sufficient pressure and volume to enable the engine to start before the oil pressure is built up, and to supply the fuel at normal operating pressure and volume only when the oil pressure has risen to its normal operating value. The improved system not only cuts off the gas feed substantially positively, but also automatically takes care of engine starting and automatically does not provide full fuel feed to the engine until the oil pressure has risen to a safe operating value.

In a system utilizing a single stage regulator the oil pressure modification of delivery pressure is applied to the control diaphragm or valve operating system of that single stage. In a multistage regulator the oil pressure modification may be applied to either or all stages, but for simplicity is at present applied to only one stage and preferably to the higher pressure stage. In the following detailed description of a typical and illustrative form of apparatus embodying the invention the oil pressure modification is so shown, applied only to the higher pressure stage of a two-stage regulator, but the invention itself is not limited thereby.

For the purpose of detailed description of illustrative apparatus reference is had to the accompanying drawing in which the single figure shows a cross section of a typical feed pressure regulator equipped with the device for modification by lubricating oil pressure, and also shows diagrammatically the connections and arrangements of the regulator and modifier in the fuel feed system and lubricating system.

The regulator which is shown by way of illustration in the drawings is a regulator and fuel heater of the type shown and claimed in Patent 2,248,222, R. F. Ensign, dated July 8, 1941. Its typical structure and operation will first be explained, so that the operation of the modifier as applied to it may be readily understood.

As shown in the drawings gaseous fuel under an initially high pressure is fed into the regulator at 10, either in gaseous or liquid form, depending upon pressures and temperatures and the nature of the gas. Passing through the strainer plug 11 and the bore 12 of valve seat member 12, the fuel reaches the inlet side of first stage valve 14. The operating diaphragm for the first stage valve is shown at 15, forming one wall of the intermediate pressure chamber 16. A valve operating lever 17 is pivoted at 18, having a short arm 19 acting on valve 14 and a long arm 20 which is acted upon by a stud 21 and a spring 22 carried by first stage diaphragm 15. The arrangement of the parts is such that pressure in chamber 16, tending to move diaphragm 15 outwardly (or up as shown in the drawings) tends to close valve 14; and the equilibrium pressure which is maintained in chamber 16, without any modifying or reference pressures being applied to the valve operating system, will depend upon the area of diaphragm 15 and the leverage ratio of valve lever 17, the effective area of valve 14 and the pressure of the fuel on that valve. Typically these relations and ratios, for the purpose of this invention, are made such that the unmodified equilibrium pressure in chamber 16 is quite low—much lower than the normal operating pressure in that chamber. For instance the equilibrium pressure, in the absence of any modifying influences applied to the valve operating system, is arranged to be equal to about ¼ inch of mercury, while the normal operating pressure, with lubricating oil pressure applied as a reference pressure to diaphragm 15, is designed to be about 20" of mercury. The pressures here given are pressures above atmosphere.

Pressure chamber 16 communicates with the chamber or bore 25 at the outlet side of valve 14 through any suitable passage, that communication being shown here as a passage around the square body 14a of valve 14. From chamber 25 the fuel passes, at the regulated intermediate pressure, through passages 26 into the inlet end 27 of a heater coil 28, and after passing through the heater coil the fuel passes from outlet end 29 to the valve seat 30 of second stage valve 31. Heater coil 28 is located in a chamber 32 to which a heating medium is applied, typically hot water from the engine radiator system. If the high pressure fuel is initially liquid (e. g. butane) sufficient heat is supplied to vaporize it at the intermediate pressure.

Second stage valve 31 is operated by a short arm 35 of a pivoted lever having a long arm 36 to which valve closing spring 37 is applied. The lever is operated by second stage diaphragm 38 which forms one wall of a low pressure gas chamber which may preferably be and is here shown as divided into two chambers 39a and 39b by a partition wall 40. This partition wall 40 is not fluid tight but is provided with a sized orifice 41 and may also have some leakage around the diaphragm stem 42 where that stem passes through the partition. The purpose of so dividing chamber 39 will be explained. The outer face of diaphragm 38 may either be directly exposed to atmosphere or may be enclosed in a chamber 43 to which modifying reference pressures may be applied as will be briefly explained. Chamber 39, including both its subdivisions 39a and 39b, is subject to atmospheric pressure when the engine is not operating, and so also is the outer face of diaphragm 38. And in the present preferred system the area of diaphragm 38, the leverage ratio of lever 35, 36, the pressure of spring 37 and the effective area of valve 31 are made to have such a relationship that, with the intermediate pressure of ¼ inch of mercury tending to open valve 31 that valve will be closed by spring 37 when atmospheric pressure exists in chambers 39 and 43 and will open only when sub-atmospheric pressure is applied to chamber 39. In other words, the equilibrium pressure on chamber 39 for which the regulator is designed, with low pressure in chamber 16 and on valve 31, is substantially below atmospheric pressure, say 0.08 inch of mercury below atmosphere.

The final fuel outlet 50 leads from chamber 39a to the gas fuel inlet 51 of the typical carburetor or mixing valve 52, the pipe connection between 50 and 51 being shown schematically by the dash line 53. When the engine is turned over for starting, and continuously during its operation, the depression at Venturi throat 54 places a sub-atmospheric pressure on regulator chamber 39a, 39b, causing low pressure diaphragm 38 to move inwardly (or upwardly as here shown) to open valve 31 and to maintain in chamber 39 (or specifically in chamber 39a) the equilibrium gas pressure of about 0.08 inch of mercury below atmosphere during the starting operation when the pressure on valve 31 is low, and a higher equilibrium pressure (say about atmospheric) when the gas pressure on valve 31 increases for normal operation as will be explained.

In normal operation the reference pressure on the outer face of diaphragm 38 is modified via a connecting tube or pipe 56 from an orifice 57 in the carburetor wall in such relation to throttle 58 that for medium ranges of engine operation a somewhat lowered pressure is applied to reference chamber 43 causing valve 31 to close down slightly to reduce pressure in chamber 43 so that economy is effected by operating the engine in its medium ranges on a somewhat lean mixture. A balance passage 57a connects orifice 57 and tube 56 with the air intake of the carbureter so that the operating pressures in diaphragm chamber 43 are based on the air pressure existing at the air intake. And also in normal operation the pressure in sub-chamber 39b is somewhat modified via connections 60, 61 and 62 to a carburetor orifice 63 which has such relation to the throttle that at idling operation a modified lowered pressure is applied to chamber 39b to cause diaphragm 39 to somewhat open valve 31 to raise the pressure in 39a and relatively enrich the fuel mixture. These control operations are fully explained in the issued patent above referred to and need no further detailed explanation here.

To such a regulator, so designed and adjusted, the oil pressure control is preferably applied in the manner now explained. The device for accomplishing this control is here shown in the form of a unitary structure which may be easily applied to the regulator and to its first stage diaphragm 15. As here shown the control device embodies a casing which encloses a diaphragm chamber 70, one wall of that chamber being formed by the oil pressure diaphragm 71 and the opposite wall by casing part 70a. The casing is mounted on the main casing of the regulator, in a position over and opposed to first stage diaphragm 15, and with oil pressure diaphragm 71 in spaced axial alinement with diaphragm 15. (The casing is secured to the regulator and the various parts of the regulator are secured together, by screws or other usual securing means, not shown.) Between the two diaphragms a compression spring 72 is arranged so as to transmit thrust from diaphragm 71 to diaphragm 15 in a direction tending to press diaphragm 15 down or inward and, by doing so, to open first-stage valve 14. Between the two diaphragms there is also a motion limiting device which limits the expansion of spring 72. In the drawings this device is shown in the form of a hollow cylindric member 73 having a flanged foot 73b contacting diaphragm plate 15a, and a headed screw 74 adjustably mounted on diaphragm 71 (or on its diaphragm plate 71a). Screw-head 74a engages the upper shouldered end 73a of member 73 when diaphragm 71 has moved up a predetermined distance with relation to diaphragm 15. With diaphragm 15 in its uppermost valve closing position, this movement limiting engagement takes place before diaphragm 71, or the parts mounted on it, have moved up far enough to engage the upper wall 70a of chamber 70. The lower end of spring 72 rests on flanged foot 73b.

Thus, with zero pressure on the upper side of diaphragm 71, that diaphragm will be moved up by spring 72 (assuming that there is some pressure in chamber 16 under diaphragm 15) until screwhead 74a engages shoulder 73a. With the parts in that relative position, spring 72 will exert no downward pressure on diaphragm 15, even though the expanded spring may still be under some substantial compression. In that condition of the parts spring 72 exerts no effective pressure to move diaphragm 15 down, diaphragms 15 and 71 then moving as a unit in response to any variation of pressure in chamber 16, and without any effective reference pressure except atmosphere on the outer face of diaphragm 15. The casing part 70b which surrounds the space between diaphragms 15 and 71 is open to atmosphere as at 70c; and with zero (atmospheric) oil pressure on the upper face of diaphragm 71 that diaphragm is in pressure balance. Under those conditions, diaphragm 15 then operates first-stage valve 14 in the manner before referred to, to maintain a relatively low intermediate pressure (the pressure of ¼ inch of mercury as illustratively stated before) in chamber 16.

The same condition of operation could of course be attained without the motion limiting device between the two diaphragms, by using a spring 72 of such characteristics that it is fully expanded, and under no compressive strain, before diaphragm 71 contacts upper wall 70a. However, the arrangement shown is preferred because spring 72 has to exert a fairly considerable downward pressure on diaphragm 15 when the spring is compressed to the condition shown in the drawing, and because it is desirable to minimize the necessary movement of diaphragm 71. Also in this arrangement the compression rate of the spring does not have to be taken into account.

Diaphragm chamber 70 is connected directly into the lubricating oil pressure line of the engine. In the drawings the engine is schematically indicated at 100 and its oil pump at 101. The pump circulates oil in a closed system through the engine, the high pressure side of the circulation system being diagrammatically illustrated at 102. The pressure inlet port 103 of chamber 70 is connected by connection 102a to this high pressure side of the oil circulation line.

With the engine not operating the pressure in the oil line is zero and oil pressure diaphragm 71 is in its upper position where spring 72 exerts no effective pressure to move first-stage diaphragm 15 down. Under those conditions the relatively low intermediate pressure is maintained in chamber 16 as previously explained. That relatively low pressure being exerted on second stage valve 31, and atmospheric pressure being present in chambers 39 and 43, spring 37 closes second stage valve 31 quite tightly.

When the engine is turned over for starting the depression in the engine intake communicated to chamber 39 causes diaphragm 38 to move up to open valve 31, and the fuel gas is then maintained in chamber 39 at or near the low equilibrium pressure before stated. The pressure in chamber 16, although low, is enough to flow gas through valve 31 in sufficient quantity for starting the engine particularly if a choke such as 52a is used on the carburetor. But it is not enough to supply the engine at any level of power output much above idling. A choke in the carburetor is desirable, because its use permits a very low value of the low intermediate pressure in 16. And, as will be noted, the tightness with which second stage valve 31 is closed when the engine is not operating depends on that pressure being low.

As soon as the engine has started in operation, the oil pressure builds up, applying an increasing oil pressure to diaphragm 71. That increasing pressure is directly and fully applied through spring 72 to diaphragm 15 until the oil pressure becomes great enough to compress the spring. At a safe oil pressure (say 10 pounds per square inch) spring 72 is compressed to separate screw head 74 from shoulder 73a. Neglecting the relatively slight effect of the compression rate of spring 72, the parts take the relative positions shown in the drawings for any oil pressure above the selected safe pressure. And under those conditions the increased reference pressure applied to diaphragm 15 as a result of increased oil pressure is limited substantially to the thrust which spring 72 is pre-stressed to, or which it is designed to transmit when diaphragm 71 has moved down to its limit. That spring transmitted thrust, acting as an increased reference pressure on diaphragm 15, immediately causes the pressure in chamber 16 to rise to the relatively high pressure desired for operating the engine at full power. That is, with increased oil pressure the valve opening pressure is increased, or the valve closing pressure is reduced. With decreased oil pressure the opposite effects on the valve take place. As before stated, that relatively higher operating pressure may be illustratively equal to about 20 inches of mercury. The compressed spring 72 exerts a unit area thrust on diaphragm 15 equal to the difference between the low unit pressure in chamber 16 and the high unit pressure in that chamber. And the effective area of oil pressure diaphragm 71 is designed with relation to the compression pressure of spring 72 so that diaphragm 71 is forced down to apply the spring pressure to diaphragm 15 when the oil pressure reaches a safe engine operating value, say 10 pounds per square inch.

With the higher intermediate pressure applied to second stage valve 31, the equilibrium delivery pressure at which that valve will open against spring 37 rises to, say, atmospheric pressure or somewhat more. Also the capacity of the regulator is raised because the pressure drop through the restricted orifice at valve 31 is much increased. The engine is thus supplied with its full fuel requirements for full power operation, both because of the increased delivery pressure and because of the increased flow capacity of the regulator. Conversely, it is because of the low delivery pressure and the small pressure drop at valve 31 that the engine is not supplied with sufficient fuel for power operation as long as the low intermediate pressure obtains at valve 31.

Valve 31 closes more tightly, in standing condition, than it would if the intermediate pressure in 16 were maintained at its high value, as it is ordinarily. The measure of the tighter closing pressure on the valve is equal to the effective valve area multiplied by the difference between the high and low intermediate pressure values. In this illustrative form and arrangement of my invention, the tight closing of the valve depends on reducing the valve opening force and that is done by reducing the intermediate gas pressure at the inlet side of the valve.

That latter function, that of lowering and raising the intermediate pressure in 16 under control of the oil pressure is the function of the modification devices which act on the first stage. Those devices and their functions may be applied to a single stage regulator or to a secondary stage of a multiple stage regulator, where they will act to modify delivery pressures. That is, in the illustrations given here, the port 30 might be viewed as the final delivery of the single stage whose outlet pressure is under oil pressure control. And it is of course immaterial whether the initial inlet 10 take fluid from a primary source or from a preceding regulator stage.

It has been said that the relatively low, non-operating pressure in chamber 16 is determined by the ratio and relationships existing between diaphragm 15 and valve 14, without any reference pressure being applied to diaphragm 15 except atmospheric pressure. That is, in the device as here illustratively shown, spring 72 then exerts no reference pressure at all on diaphragm 15 and the operation of oil pressure diaphragm 71 varies that spring-applied reference pressure between zero and the desired full amount. The low non-operating pressure in chamber 16 may however be determined by a reference pressure applied through spring 72, or by another spring. For instance, if it is desired to have a low pressure which is somewhat higher than that which would be maintained in equilibrium by the diaphragm-valve train alone, the following described arrangement can be made. The parts 73 and 74, or their functions, may be eliminated. Spring 72 may then be chosen of such a spring rate that, with diaphragm 71 up against the upper wall of chamber 70, spring 72 will exert the desired small downward reference pressure on diaphragm 15; and so that, when diaphragm 71 is in its lower position illustrated, the reference pressure exerted by spring 72 is the desired higher reference pressure. Or, as is preferred, a second spring 72a may be arranged as shown to permanently press diaphragm 15 down to give the desired low pressure in chamber 16, and spring 72 is then arranged as described so that all its thrust is taken off the diaphragm when the oil pressure is low.

I claim:

1. In a gaseous-fuel feed system for an internal combustion engine which has a pressure lubricating system, said fuel feed system embodying a pressure regulator through which the fuel is delivered to the engine intake at regulated pressure, and the pressure regulator embodying a pressure controlling unit comprising a flow controlling valve and a valve operating diaphragm actuated in a valve closing direction by pressure existent at the outlet side of the valve to maintain a predetermined delivery pressure; the combination of means actuated by the existence of lubricant pressure in the lubricating system and acting to apply a yielding valve-opening pressure to the pressure controlling unit of the regulator, thereby to increase the delivery pressure of the regulator when lubricant pressure exists.

2. In a gaseous-fuel feed system for an internal combustion engine which has a pressure lubricating system, said fuel feed system embodying a pressure regulator through which the fuel is delivered to the engine intake at regulated pressure, and the pressure regulator embodying a pressure controlling unit comprising a flow controlling valve and a valve operating diaphragm actuated in a valve closing direction by pressure existent at the outlet side of the valve to maintain a predetermined delivery pressure; the combination of means actuated by existence of lubricant pressure in the lubricating system and acting to apply a yielding valve-opening pressure to the diaphragm of the regulator, thereby to increase the delivery pressure of the regulator when lubricant pressure exists.

3. In a gaseous-fuel feed system for an internal combustion engine which has a pressure lubricating system, said fuel feed system embodying a pressure regulator through which the fuel is delivered to the engine intake at regulated pressure, and the pressure regulator embodying a pressure controlling unit comprising a flow controlling valve and a valve operating diaphragm actuated in a valve closing direction by pressure existent at the outlet side of the valve to maintain a predetermined delivery pressure; the combination of means actuated by existence of lubricant pressure in the lubricating system and acting to apply a yielding valve-opening pressure to the diaphragm of the regulator, thereby to increase the delivery pressure of the regulator when lubricant pressure exists, said means embodying a diaphragm movable by lubricant pressure, a lubricant chamber at one side of said diaphragm and connected with the pressure lubricant system, and an elastic element between the lubricant pressure diaphragm and the regulator diaphragm to transmit pressure from the former to the latter.

4. In a gaseous-fuel feed system for an internal combustion engine which has a pressure lubricating system, said fuel feed system embodying a pressure regulator through which the fuel is delivered to the engine intake at regulated pressure, and the pressure regulator embodying two stages of pressure control, each stage comprising a flow controlling valve and a valve operating diaphragm actuated by pressure at the outlet side of the valve, the first stage being set to normally deliver gas at a predetermined pressure above atmosphere, the valve of the second stage taking gas from the outlet side of the first stage valve and being subject to opening by the pressure of that gas, and the second stage being set to normally deliver gas at a pre-determined sub-atmospheric pressure; the combination of means actuated by the existence of lubricant pressure in the lubricating system and acting to apply a yielding valve-opening pressure to the first stage of pressure control, thereby to increase the pressure at the outlet side of that valve as the lubricant pressure increases.

5. In a gaseous-fuel feed system for an internal combustion engine which has a pressure lubricating system, said fuel feed system embodying a pressure regulator through which the fuel is delivered to the engine intake at regulated pressure, and the pressure regulator embodying two stages of pressure control, each stage comprising a flow controlling valve and a valve operating diaphragm actuated by pressure at the outlet side of the valve, the first stage being set to normally deliver gas at a predetermined pressure above atmosphere, the valve of the second stage taking gas from the outlet side of the first stage valve and being subject to opening by the pressure of that gas, and the second stage being set to normally deliver gas at a pre-determined sub-atmospheric pressure; the combination of means actuated by existence of lubricant pressure in the lubricating system and acting to apply a yielding valve-opening pressure to the first stage of pressure control, thereby to increase the pressure at the outlet side of that valve as the lubricant pressure increases, said means embodying a diaphragm movable by lubricant pressure, a lubricant chamber at one side of said diaphragm and connected with the pressure lubricant system, and an elastic element between the lubricant pressure diaphragm and the first stage diaphragm transmitting pressure from the former to the latter in such direction as to tend to move the latter in a valve-opening direction.

6. A pressure modifying device adapted to be used in combination with a gas pressure regulator which embodies a pressure controlling valve and a valve actuating diaphragm having its inner face subject to the gas pressure at the outlet side of the valve and moving inwardly to open the valve; said device comprising a unitary structure embodying a casing, a diaphragm forming one wall of an oil-pressure chamber the other walls of which are formed by the casing, the casing being adapted to be secured to the regulator with the outer face of the oil-pressure diaphragm in spaced opposition to the outer face of the regulator diaphragm, a compression spring adapted to lie between the two diaphragms and to transmit inward pressure to the regulator diaphragm from the oil pressure diaphragm, and a mounting for the spring on the oil-pressure diaphragm, said mounting embodying two members which are relatively telescopically movable and provided with interengaging shoulders to limit their relative expansive movement, one of said members being directly mounted on the oil-pressure diaphragm, the other member having a shoulder near its outer end on which the outer end of the spring bears.

7. In a gaseous-fuel feed system for an internal combustion engine which has a pressure lubricating system, said fuel feed system embodying a pressure regulator through which the fuel is delivered to the engine intake at regulated pressure, and the pressure regulator embodying a pressure controlling unit comprising a flow controlling valve and a valve operating diaphragm actuated in a valve closing direction by pressure existent at the outlet side of the valve to maintain a predetermined delivery pressure; the combination of means actuated by virtue of pressure variation of the lubricant in the lubricating system and acting to apply a correspondingly varying yielding pressure to the pressure controlling unit in a valve opening direction.

8. The combination defined in claim 7 and in which the last mentioned means includes a pressure limiting element which limits the valve opening pressure applied to the pressure controlling unit.

9. The combination defined in claim 7 and in which the last mentioned means comprises a diaphragm forming one wall of a diaphragm chamber to which lubricant pressure is applied, and a pressure transmitting unit acting between said diaphragm and the valve operating diaphragm, said unit including a resiliently yielding element.

10. The combination defined in claim 7 and in which the last mentioned means comprises a diaphragm forming one wall of a diaphragm chamber to which lubricant pressure is applied, and a pressure transmitting unit acting between said diaphragm and the valve operating diaphragm, said unit including a pre-stressed spring resiliently yielding element.

ROY F. ENSIGN.

REFERENCES CITED

The following references are of record in the file of this patent:

UNITED STATES PATENTS

| Number | Name | Date |
| --- | --- | --- |
| 1,585,732 | Otto | May 25, 1926 |
| 2,033,842 | McFarland | Mar. 10, 1936 |
| 2,226,865 | Kirchhoff | Dec. 31, 1940 |
| 2,294,152 | Yates et al. | Aug. 25, 1942 |
| 2,313,991 | Fitch | Mar. 16, 1943 |
| 2,336,653 | Taylor | Dec. 14, 1943 |

FOREIGN PATENTS

| Number | Country | Date |
| --- | --- | --- |
| 419,920 | Great Britain | Nov. 21, 1934 |
| 848,603 | France | Nov. 3, 1939 |